United States Patent [19]

Miller

[11] Patent Number: 5,398,740
[45] Date of Patent: Mar. 21, 1995

[54] POWER TOOL TABLE WITH ADJUSTABLE TOOL MOUNTING PLATE INSERT AND RELATED METHOD

[76] Inventor: Manford B. Miller, 13788 Market Ave., North Hartville, Ohio 44632

[21] Appl. No.: 151,162

[22] Filed: Nov. 12, 1993

[51] Int. Cl.$^6$ .............................................. B25H 1/00
[52] U.S. Cl. .................. 144/286 R; 83/574; 144/1 R; 144/134 A; 144/286 A
[58] Field of Search .............. 144/1 R, 286 R, 286 A, 144/134 R, 134 A; 83/574

[56] References Cited

U.S. PATENT DOCUMENTS

| | | | |
|---|---|---|---|
| 2,615,479 | 10/1952 | Bearup | 144/1 |
| 3,342,226 | 9/1967 | Marcoux et al. | 144/286 R |
| 4,294,297 | 4/1979 | Kieffer | 144/134 D |
| 4,350,193 | 9/1982 | McCambridge et al. | 144/286 R |
| 4,483,573 | 11/1984 | Keller | 144/286 R |
| 4,635,692 | 1/1987 | Hulse et al. | 144/286 R |
| 4,733,704 | 3/1988 | Wolff | 144/286 R |
| 4,774,986 | 10/1988 | LaGra | 144/286 R |
| 4,844,135 | 7/1989 | Witt | 144/371 |
| 5,024,257 | 6/1991 | Lloyd | 144/1 R |
| 5,025,841 | 6/1991 | Totten | 144/134 R |
| 5,042,542 | 8/1991 | Purviance | 144/134 A |
| 5,139,065 | 8/1992 | Stark | 144/371 |

Primary Examiner—W. Donald Bray
Attorney, Agent, or Firm—Renner, Kenner, Greive, Bobak, Taylor & Weber

[57] ABSTRACT

A work table (10) according to the present invention includes a generally planar work surface (12) having an insert receiving aperture (27) therein, and a mounting plate insert (20) adjustably positionable and received within the aperture (27); and, adjustment means (40, 42) carried by the mounting plate insert (20) to adjust the position of the mounting plate insert (20) relative to the generally planar work surface (12).

12 Claims, 4 Drawing Sheets

POWER TOOL TABLE WITH ADJUSTABLE TOOL MOUNTING PLATE INSERT AND RELATED METHOD

TECHNICAL FIELD

This invention relates to a table for the mounting and use of a power tool. More particularly, the invention relates to a power tool table having a generally planar work surface and an insert therein for mounting the tool to the work table. Specifically, the invention relates to such a table wherein the insert is adjustable relative to the planar work surface of the table.

BACKGROUND OF THE INVENTION

It is generally known in the power tool art, to mount the power tool with respect to a table or other surface, and to then move the piece of material to be worked with respect to the tool. For example, in woodworking, a router is often mounted below a surface, such that the router bit extends vertically upward through an opening within the surface. The material to be worked is then passed over the work surface and into engagement with the router bit, whereupon the material is cut by the bit.

It is also known in the art to provide a surface with which such a tool is used with a mounting plate to which the tool is actually affixed. The mounting plate is then affixed or secured to the work surface, often by being received within an aperture within the work surface. Such a plate is desirable so that the tool need not be affixed directly to the work surface. It is desirable to maintain the work surface in as level and pristine a condition as possible, and a power tool affixed directly to the work surface will begin to degrade the work surface over time.

By providing a mounting plate, wear and tear upon the work surface is minimized. It has been found however, that over time, the mounting plate itself will begin to degrade. Further still, one mounting plate often is of a different size than another mounting plate. When such degraded or different sized mounting plates are employed, there is often a gap between the mounting plate and the work surface. Further, when the mounting plate is received within an aperture within the work surface, the edge or portions of the edge of the mounting plate may be higher or lower than the edge of the work surface at the receiving aperture. Such higher or lower edges will often "catch" the material to be worked, resulting in damage to the material and even some danger to the power tool operator.

A need exists therefore, for a mounting plate which is insertable within a work surface, and which may be adjusted with respect to the work surface such that it can be made to be flush with the work surface.

SUMMARY OF INVENTION

It is therefore, an object of the present invention to provide a work surface for a power tool.

It is another object of the present invention to provide a work surface having an adjustable power tool mounting plate therein.

It is still another object to provide a method for adjusting a mounting plate with respect to a work surface.

At least one or more of the foregoing objects, together with the advantages thereof over the known art relating to power tool work surfaces, which shall become apparent from the specification which follows, are accomplished by the invention as hereinafter described and claimed.

In general the present invention provides a work table for a power tool. The work table comprises a top portion having a generally planar work surface on one side thereof, and an insert aperture therein. The insert aperture opens to the work surface. The work table also includes a mounting plate insert adjustably positionable within and receivable within the insert aperture, and having a secondary planar work surface on one side thereof. The mounting plate insert has means to mount the power tool thereto; and the mounting plate insert has means to adjust the position of the mounting plate insert within the aperture and with respect to the planar work surface of the top portion.

The invention also includes a work table which comprises a generally planar work surface having an insert receiving aperture therein, and a mounting plate insert adjustably positionable and received within the aperture; and, adjustment means carried by the mounting plate insert to adjust the position of the mounting plate insert relative to the generally planar work surface.

The present invention also includes a method of adjusting the position of a power tool mounting plate relative to a work surface, which comprises mounting the power tool to a mounting plate insert having a tool receiving opening therein such that at least a portion of the power tool extends through said tool receiving opening; positioning the mounting plate insert within an insert receiving aperture carried within the work surface; and, adjusting the position of the mounting plate within the insert receiving aperture.

PREFERRED EMBODIMENTS FOR CARRYING OUT THE INVENTION

Figure 1:
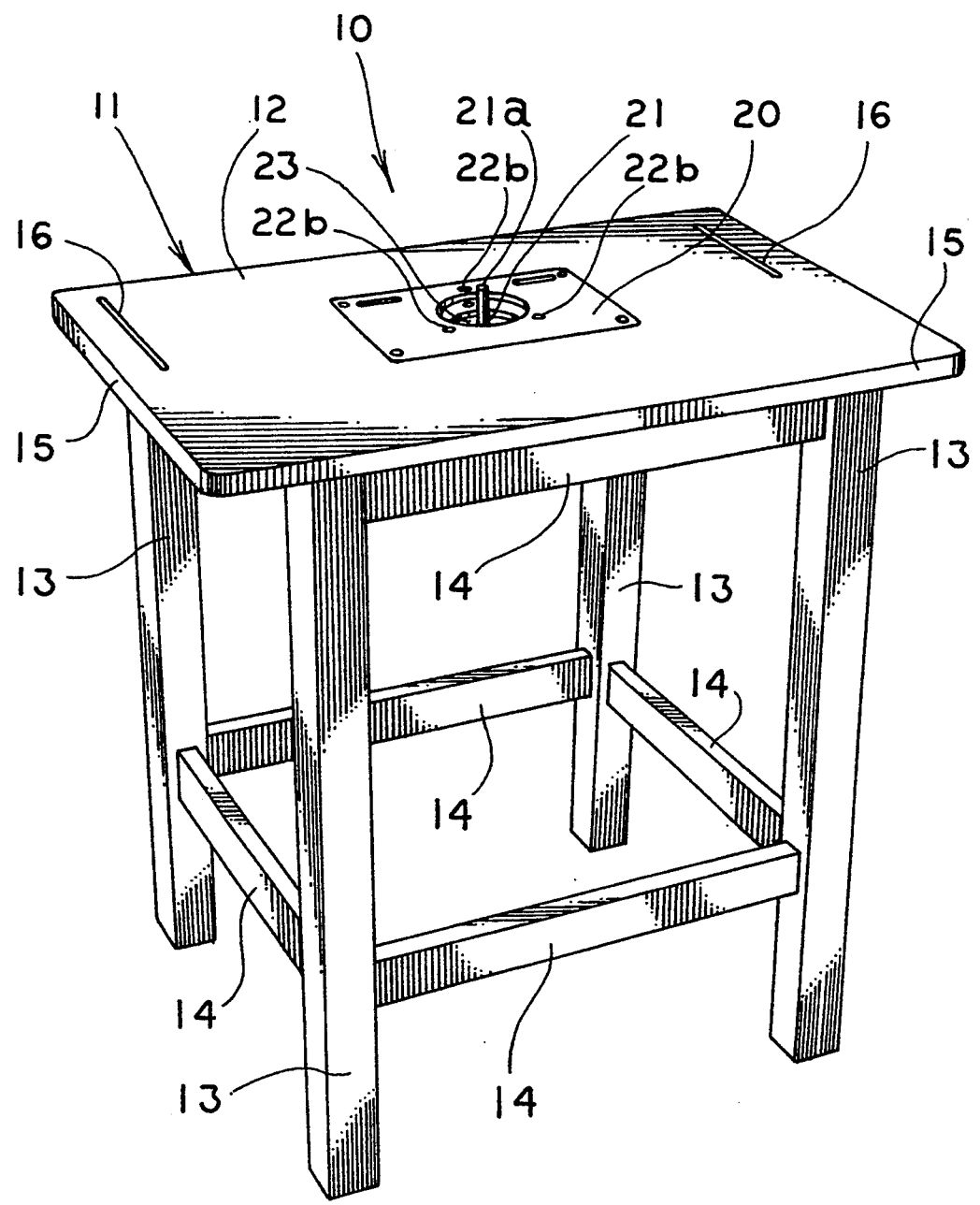
FIG. 1 is a perspective view of a power tool table having an adjustable tool mounting plate insert received therein, according to one embodiment of the present invention.

A table having an adjustable insert is generally designated by the number 10 on the attached drawings. Table 10 includes a top portion generally indicated by the number 11, having a generally planar work surface 12 on one side thereof. Table 10 may also be provided with legs 13 having cross supports 14, which cooperate with top portion 12 to elevate top portion 11. Legs 13 and/or cross supports 14 may be affixed to the top portion, such as by being placed thereupon as depicted in the drawings. Top portion 11 may also be affixed to legs 13 and/or cross supports 14, in any manner conventional in the art but which is not shown in the drawings.

It will be appreciated that as used herein, the word "table" need not necessarily be limited to a top portion supported by and elevated by legs. Any structure having a work surface is within the scope of the invention, including benches, counter tops and the like. Furthermore, while it is a preferred embodiment to have a generally planar work surface 12, the work surface need not be planar, and other configurations are within the scope of the invention. For exemplary purposes however, the present disclosure will make reference to a generally planar work surface 12 of a top portion 11 supported and elevated by legs 13 cooperating with cross supports 14.

Top portion 11 may be of any configuration. One preferred configuration is generally rectangular as depicted in the drawings. Top portion 11 has downwardly extending sidewalls 15, and a second surface (not shown) which is in a generally parallel spaced relation with work surface 12.

Work surface 12 may be provided with elements to support additional equipment, such as a guide fence (not shown) or the like, as is common in the art. For example, slots 16 may be provided within work surface 12 for this purpose.

There is received within top portion 11, a tool mounting plate insert 20 which will be used to mount a power tool such as a router 21. The actual mounting of router 21 to mounting plate insert 20 is not critical to the invention. Routers such as router 21 are known to be affixed to a support surface such as top portion 12, by for example, the use of a bolt 22a (FIG. 2) within a tool mounting aperture 22b (FIG. 3). A spindle portion 21a of router 21 extends through a tool aperture 23 in mounting plate insert 20. Mounting plate insert 20 is provide with first and second parallel spaced face portions 24 and 25 respectively, separated by edge portion 26. The length dimension of edge portion 26 between first and second face portions 24 and 25, determines the thickness dimension of mounting plate insert 20.

Figure 2:
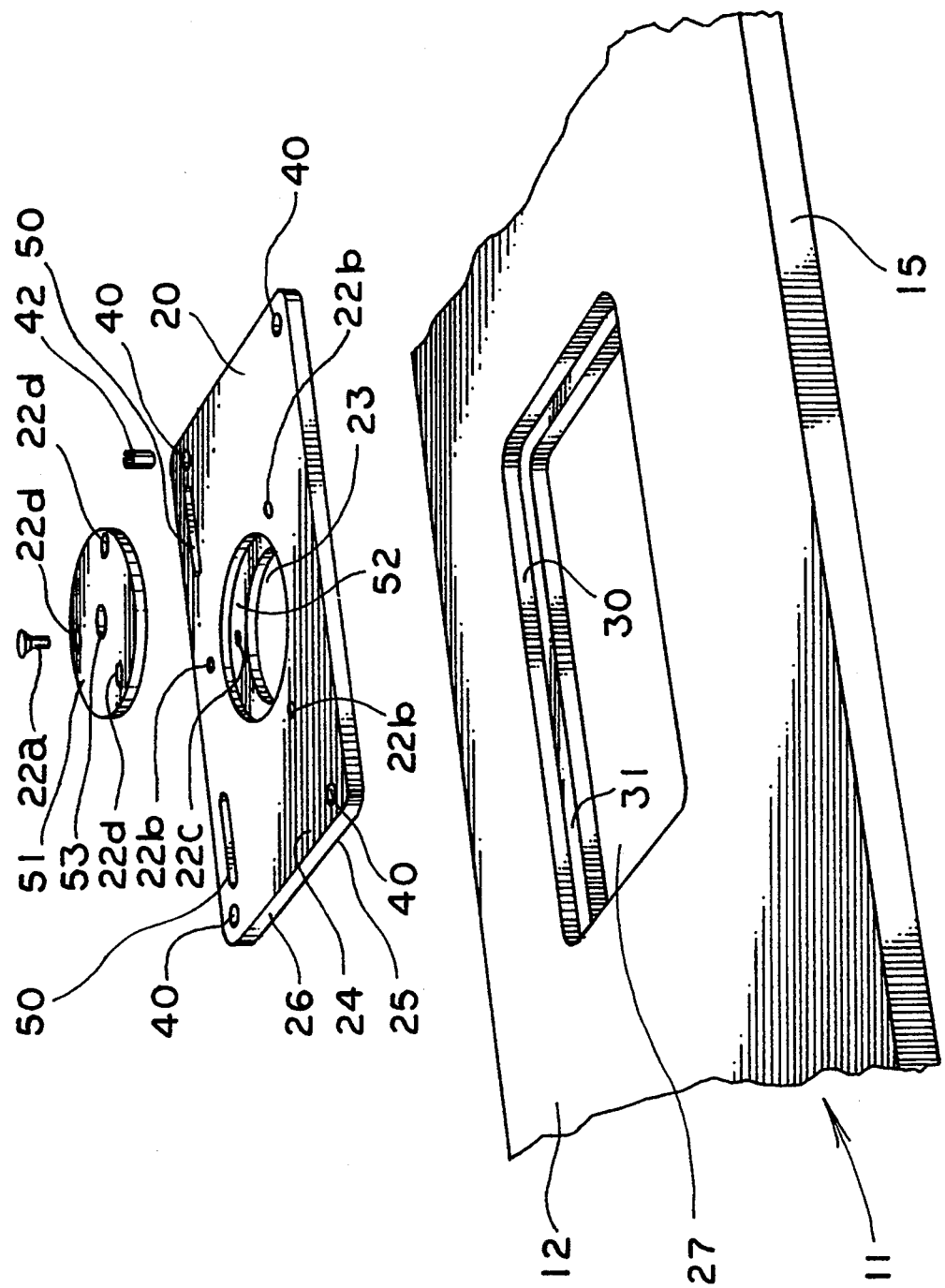
FIG. 2 is a closeup, partially broken, explode view of the table with insert of FIG. 1, showing an alternative embodiment of a second tool mounting insert.
Figure 3:
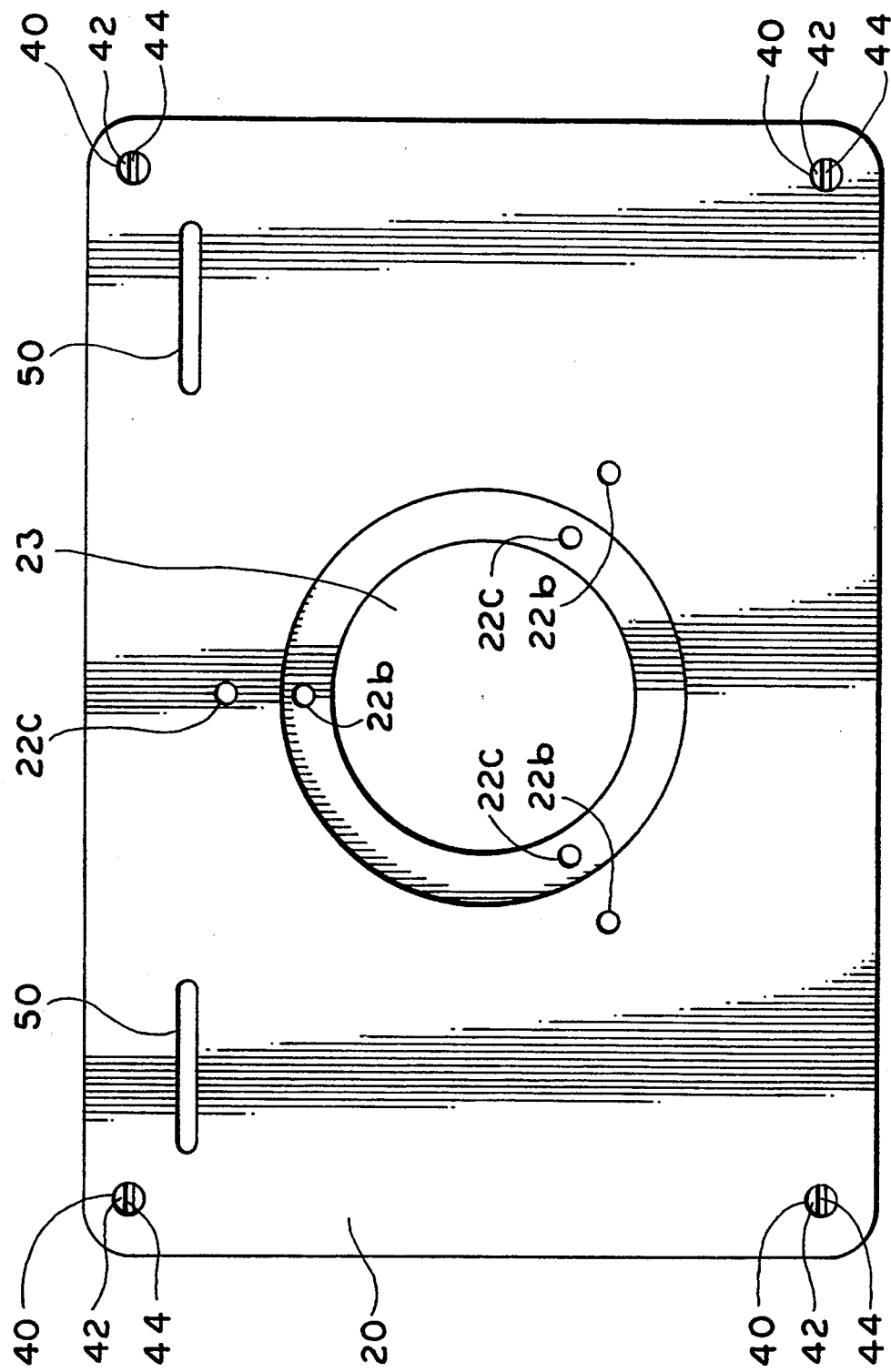
FIG. 3 is a top plan, closeup view of a tool mounting plate insert according to the present invention; and, FIG. 4 is a closeup, sectional view of one portion of the table and insert of FIG. 1.

With reference to FIG. 2, a preferred embodiment of the present invention has an insert aperture generally designate by the number 27. Insert aperture 27 is preferably generally configured in a complimentary configuration to mounting plate insert 20. For example, as shown in the drawings, one embodiment of mounting plate insert 20 is generally rectangular in shape, and insert aperture 27 is generally configured in a complimentary shape, such that mounting plate insert 20 is receivable within insert aperture 27 (FIG. 1).

Insert aperture 27 is defined by an inner periphery wall 30, which extends downwardly from work surface 12 and within top portion 11. At a location on inner periphery wall 30, there is preferably provided a support ledge 31, which preferably extends outwardly into insert aperture 27, and at a generally right angle to downwardly extending inner periphery wall 30. A secondary inner periphery wall 32 may continue to extend downwardly from ledge 31 as depicted in the drawings.

As stated hereinabove, insert aperture 27, and hence, inner periphery wall 30, are configured such that mounting plate insert 20 may be received therein. It is also preferred that when mounting plate insert 20 is received within insert aperture 27 as depicted in FIG. 1, there is substantially no gap be present between mounting plate insert 20 and inner periphery wall 30.

Ledge 31 also preferably bounds an area of insert aperture 27. It is preferred that ledge 31 is configured such that its width dimension bounds an area of insert aperture 27 which is smaller than the length dimensions of mounting plate 20. Hence, when mounting plate 20 is received within insert aperture 27, it is supported by ledge 31. It will be appreciated that other means of supporting mounting plate insert 20 are within the scope of the invention.

It is preferred that mounting plate 20 be fabricated to have a thickness dimension which is substantially equal to or somewhat less than the height dimension of downwardly extending inner peripheral wall 30. In this way, mounting plate insert 20 may be received within insert aperture 27, such that first face portion 24 is either within the plane of work surface 12 or below that plane. It is desired to have first face portion 24 of mounting plate insert 20 be substantially within the plane of work surface 12, i.e., to be "flush" therewith.

Figure 4:
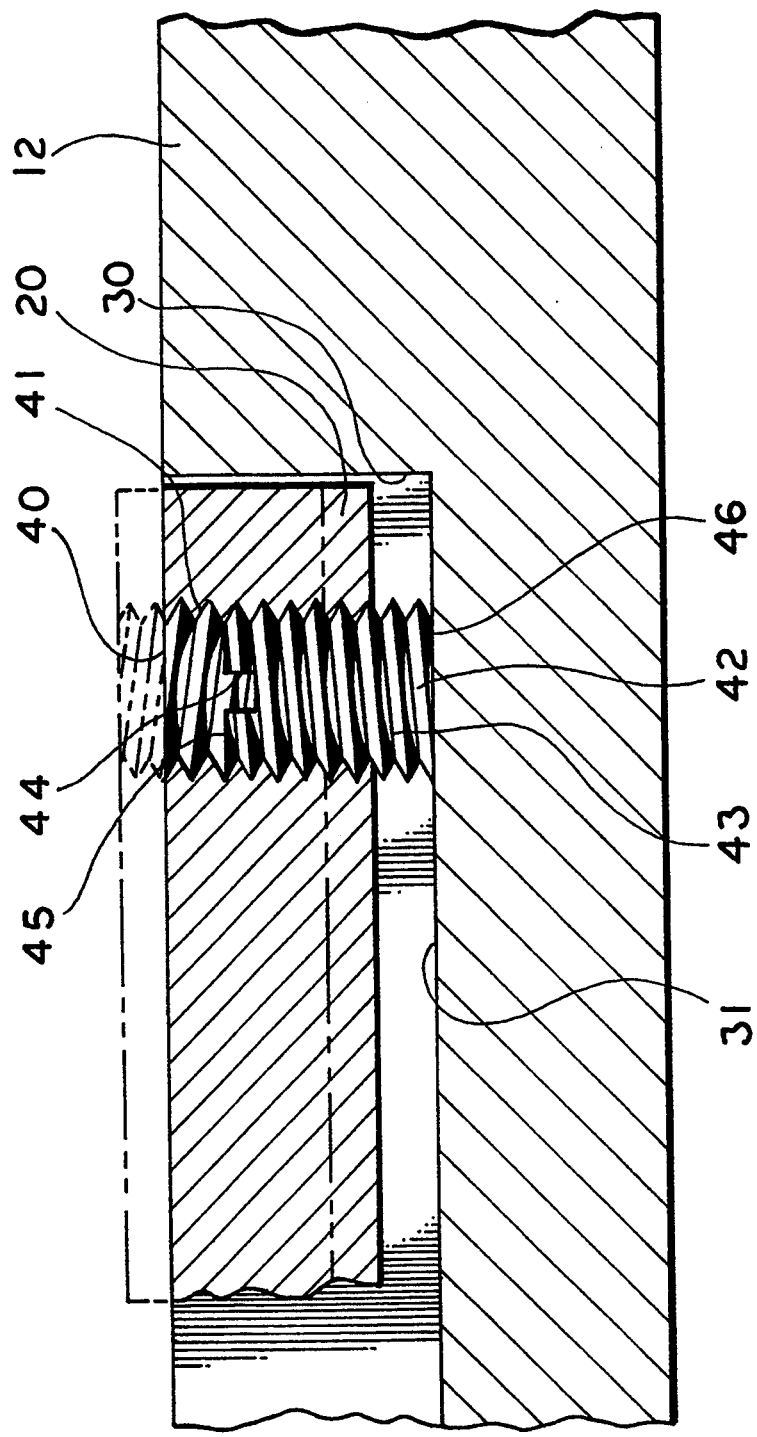

As shown in FIG. 3, mounting plate insert 20 is provided with at least one adjustment aperture 40, which preferably extends through the entire width of mounting plate insert 20 as showing in FIG. 4. It is also preferred that adjustment aperture 40 is positioned within mounting plate insert 20, such that adjustment aperture 40 is proximate to ledge 31 when mounting plate insert 20 is received within insert aperture 27. Adjustment aperture 40 is provided with screw threads 41, which may threadably interact with a set screw 42 having complimentary screw threads 43 therein. Set screw 42 may be provided with a groove 44 which may be used to turn set screw 42 such as by means of a screw driver (not shown) or the like. Of course, any means for turning set screw 42 is within the scope of the invention.

As shown in FIG. 4, set screw 42 has a first end 45 which carries groove 44, and a second end 46 which abuts or physically engages or touches and is supported by ledge 31. In this manner, wherein mounting plate insert 20 may or may not be in physical contact with ledge 31, set screw 42 may be rotated, such that operative interaction with screw threads 41 and 43, causes mounting plate insert 20 to be moved relative to the plane of work surface 12. For example, as depicted in phantom lines in FIG. 4, when received within insert aperture 27, a portion of mounting plate insert 20 may extend above the plane of work surface 12. By properly turning set screw 42, such that second end 46 thereof interacts by physically contacting or engaging ledge 31, mounting plate insert 20 can be caused to be moved to the position shown in solid lines in FIG. 4, wherein it is substantially flush with the plane of work surface 12. Of course, when a tool such as router 21 is affixed to mounting plate insert 20 as discussed hereinabove, the tool is also adjusted relative to work surface 12. By properly adjusting the position of mounting plate 20 relative to set screws 42 by rotatable and threadably moving set screw 42, the position of mounting plate 20 relative to the plane of work surface 12 is adjusted, and can be so adjusted until first face 24 is flush therewith.

It is preferred to provide a plurality of adjustment apertures 40 and set screws 42, such that all portions of mounting plate insert 20 may be separately and independently adjusted relative to work surface 12. For example, as shown in FIG. 3, generally rectangular mounting plate insert 20 is provide with four adjustment apertures 40 and set screws 42. Of course, any number of apertures and set screws may be employed.

Mounting plate insert 20 may be provided with means for supporting additional equipment, such as guide fences or the like (not shown), such as slots 50 therein.

Mounting plate insert 20 may also be provided with a secondary insert 51 (FIG. 2), which is receivable within tool aperture 23 in mounting plate insert 20. Mounting plate 20 may be provided with a secondary ledge 52 which will supportively engage secondary insert 51. Secondary insert 51 may be provided with a secondary tool aperture 53 through which a tool, such as spindle 21a of router 21 can extend. Secondary ledge 52 may be provided with secondary tool mounting apertures 22c, and secondary insert 51 is also provided with secondary tool mounting apertures 22d, through which bolt 22a may be inserted to mount router 21. By use of secondary insert 51, tools of varying size can be accommodated within a single mounting plate insert 20. If the tool of choice has means to mount which do not correspond to tool mounting apertures 22b, then properly corresponding apertures such as secondary tool mounting apertures 22d may be employed.

Thus it should be evident that the device and methods of the present invention are highly effective in adjusting the position of a mounting plate insert relative to the plane of a work surface. The invention is particularly suited for power tools for woodworking and the like, but is not necessarily limited thereto. The device and method of the present invention can be used separately with other equipment, methods and the like.

Based upon the foregoing disclosure, it is now apparent that the use of the insert described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A work table for a power tool comprising:
a top portion having a generally planar work surface on one side thereof, and an insert aperture therein, said inset aperture opening to said work surface; and,
a mounting plate insert adjustably positionable within and receivable within said insert aperture, and having a secondary planar work surface on one side thereof;
wherein said mounting plate insert has means to mount the power tool thereto; and wherein said mounting plate insert has means to adjust the position of said mounting plate insert within said aperture and with respect to said planar work surface of said top portion;
and wherein said aperture has an inner periphery bounded by an inner wall extending from said work surface and within said top portion; said inner wall including insert support ledge means for supportably engaging said mounting plate insert when said mounting plate insert is positioned within said aperture; said means to adjust the position of said mounting plate insert within said aperture including a screw means threadably secured to said mounting plate insert and within a threaded adjustment aperture therethrough.

2. A work table, as set forth in claim 1, wherein said adjustment aperture is positioned within said mounting plate insert at a position such that it is proximate to said insert support ledge when said mounting plate insert is positioned within said insert aperture.

3. A work table, as set forth in claim 2, wherein said screw means includes a first and a second end, wherein said first end is positionable through said adjustment aperture, such that said first end abuts said insert support ledge; such that as said screw means is adjustably positioned within said adjustment aperture by threaded engagement therewith, said mounting plate insert is adjustably positioned within said insert aperture and with respect to said planar work surface of said top portion.

4. A work table, as set forth in claim 1, wherein said means to mount the power tool includes a tool mounting aperture carried within said mounting plate insert.

5. A work table, as set forth in claim 1, comprising a plurality of said screw means.

6. A work table, as set forth in claim 5, wherein both said insert aperture and said mounting plate insert are generally rectangular in shape having four corners, and include a screw means in each said corner.

7. A work table comprising:
a generally planar work surface having an insert receiving aperture therein, and a mounting plate insert adjustably positionable and received within said aperture; and,
adjustment means carried by said mounting plate insert to adjust the position of said mounting plate insert relative to said generally planar work surface;
wherein said aperture has an inner periphery bounded by an inner wall extending from said work surface; said inner wall including insert support ledge means for supportably engaging said mounting plate insert when said mounting plate insert is positioned within said aperture; said adjustment means including a screw means threadably secured to said mounting plate insert and within a threaded adjustment aperture therethrough.

8. A method of adjusting the position of a power tool mounting plate relative to a work surface comprising:
mounting the power tool to a mounting plate insert having a tool receiving opening therein such that at least a portion of the power tool extends through said tool receiving opening;
positioning said mounting plate insert within an insert receiving aperture carried within the work surface; and,
adjusting the position of said mounting plate within said insert receiving aperture;
wherein adjusting the position of said mounting plate within said insert receiving aperture includes reversibly positioning a screw means threadably engaged with an adjustment aperture carried by said mounting plate insert.

9. A work table for a power tool comprising:
a top portion having a generally planar work surface on one side thereof, and an insert aperture therein, said inset aperture opening to said work surface; and,
a mounting plate insert adjustably positionable within and receivable within said insert aperture, and having a secondary planar work surface on one side thereof;
wherein said mounting plate insert has means to mount the power tool thereto; and wherein said mounting plate insert has means to adjust the position of said mounting plate insert within said aperture and with respect to said planar work surface of said top portion;
and wherein said aperture has an inner periphery bounded by an inner wall extending from said work surface and within said top portion; said inner wall including insert support ledge means for supportably engaging said mounting plate insert when said mounting plate insert is positioned within said aperture; said mounting plate insert having an outer periphery which is dimensioned such that when said mounting plate insert is received within said insert aperture, there is substantially no gap between said outer periphery of said mounting plate insert and said inner periphery of said insert aperture.

10. A work table for a power tool comprising:
a top portion having a generally planar work surface on one side thereof, and an insert aperture therein, said inset aperture opening to said work surface;
a mounting plate insert adjustably positionable within and receivable within said insert aperture, and having a secondary planar work surface on one side thereof; and,
support means attached to the other side of said top portion to elevate said top portion
wherein said mounting plate insert has means to mount the power tool thereto; and wherein said mounting plate insert has means to adjust the position of said mounting plate insert within said aperture and with respect to said planar work surface of said top portion.

11. A work table, as set forth in claim 10, wherein said mounting plate insert includes a tool opening therein, such that when the power tool is mounted to said mounting plate insert, said tool extends through said tool opening.

12. A work table comprising:
a generally planar work surface having an insert receiving aperture therein, and a mounting plate insert adjustably positionable and received within said aperture; and,
adjustment means carried by said mounting plate insert to adjust the position of said mounting plate insert relative to said generally planar work surface;
wherein said aperture has an inner periphery bounded by an inner wall extending from said work surface; said inner wall including insert support ledge means for supportably engaging said mounting plate insert when said mounting plate insert is positioned within said aperture; said mounting plate insert having an outer periphery which is dimensioned such that when said mounting plate insert is received within said insert aperture, there is substantially no gap between said outer periphery of said mounting plate insert and said inner periphery of said insert aperture.

* * * * *